(12) United States Patent
Zhang

(10) Patent No.: US 9,904,315 B2
(45) Date of Patent: Feb. 27, 2018

(54) ELECTRONIC DEVICE

(71) Applicant: Lenovo (Beijing) Co., Ltd., Beijing (CN)

(72) Inventor: Qiang Zhang, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 2 days.

(21) Appl. No.: 14/669,525

(22) Filed: Mar. 26, 2015

(65) Prior Publication Data

US 2016/0062394 A1    Mar. 3, 2016

(30) Foreign Application Priority Data

Aug. 27, 2014   (CN) .......................... 2014 1 0427955

(51) Int. Cl.
    *G06F 1/16*      (2006.01)

(52) U.S. Cl.
    CPC ............ *G06F 1/1618* (2013.01); *G06F 1/162* (2013.01); *G06F 1/166* (2013.01); *G06F 1/1626* (2013.01); *G06F 1/1667* (2013.01); *G06F 1/1669* (2013.01)

(58) Field of Classification Search
    CPC ....... G06F 1/1618; G06F 1/162; G06F 1/1667
    See application file for complete search history.

(56) References Cited

U.S. PATENT DOCUMENTS

| | | | | |
|---|---|---|---|---|
| 6,798,649 B1 * | 9/2004 | Olodort | ................. | G06F 1/1618 235/61 R |
| 7,155,266 B2 * | 12/2006 | Stefansen | ............. | H04M 1/022 16/368 |
| 7,286,341 B1 * | 10/2007 | Chang | ................... | G06F 1/1618 312/223.2 |
| 2003/0206394 A1 * | 11/2003 | Ossia | ...................... | G06F 1/162 361/679.27 |
| 2003/0213101 A1 * | 11/2003 | Lin | ....................... | G06F 1/1618 16/368 |
| 2004/0001049 A1 * | 1/2004 | Oakley | ................ | G06F 1/1618 345/173 |
| 2004/0201871 A1 * | 10/2004 | Risheq | .................. | G06F 1/1618 358/474 |
| 2004/0207596 A1 * | 10/2004 | Yu | ......................... | G06F 1/1618 345/156 |
| 2006/0152484 A1 * | 7/2006 | Rolus Borgward | .. | G06F 1/1618 345/157 |
| 2007/0058351 A1 * | 3/2007 | Kitsopoulos | .......... | G06F 1/1618 361/729 |
| 2008/0063456 A1 * | 3/2008 | Lahr | ..................... | G06F 1/1615 400/491 |

(Continued)

*Primary Examiner* — Binh Tran
*Assistant Examiner* — Douglas Burtner
(74) *Attorney, Agent, or Firm* — Harness, Dickey & Pierce, P.L.C.

(57) ABSTRACT

An electronic device is provided according to the present application, which includes a first body having a working surface; and a second body having a main body and a support body, the main body has an operational surface, and the main body rotatably couples to the first body and the support body via respective opposing edges of the main body. The electronic device is operable in a stand mode, wherein respective corresponding edges of the main body and the support body are arranged to rest on a support surface to prevent the operational surface of the main body from contacting against the support surface in the stand mode.

12 Claims, 3 Drawing Sheets

(56) References Cited

U.S. PATENT DOCUMENTS

| | | | | |
|---|---|---|---|---|
| 2010/0157518 A1* | 6/2010 | Ladouceur | ............ | G06F 1/1616 |
| | | | | 361/679.09 |
| 2011/0199310 A1* | 8/2011 | Oakley | ................ | G06F 1/1618 |
| | | | | 345/168 |
| 2012/0314359 A1* | 12/2012 | Hsieh | .................... | G06F 1/1616 |
| | | | | 361/679.12 |
| 2013/0285881 A1* | 10/2013 | Loo | ...................... | G06F 3/1423 |
| | | | | 345/1.1 |
| 2014/0160654 A1* | 6/2014 | Yoo | ...................... | G06F 1/1637 |
| | | | | 361/679.12 |
| 2014/0301028 A1* | 10/2014 | Huang | ................ | G06F 1/1637 |
| | | | | 361/679.06 |
| 2015/0023030 A1* | 1/2015 | Tsukamoto | ........... | G06F 1/1652 |
| | | | | 362/419 |
| 2015/0085433 A1* | 3/2015 | Kim | ...................... | G06F 1/1641 |
| | | | | 361/679.01 |
| 2015/0277506 A1* | 10/2015 | Cheah | .................. | G06F 1/1681 |
| | | | | 361/679.27 |

\* cited by examiner

ELECTRONIC DEVICE

This application claims the benefit of priority to Chinese Patent Application No. 201410427955.5 titled "ELECTRONIC DEVICE", filed with the Chinese State Intellectual Property Office on Aug. 27, 2014, the entire disclosure of which is incorporated herein by reference.

FIELD

This application relates to the technical field of machinery industry, and in particular to an electronic device.

BACKGROUND

With the development of society, electronic devices, such as a laptop, are more and more widely used in people's production and life.

A kind of electronic device includes a first body and a second body. The first body is arranged at an end of the second body and is rotatable around the second body. In the case that an opening angle of the first body with respect to the second body is 0 degree, a working surface of the first body abuts against an operational surface of the second body (i.e. the side surface with an input device, such as a keyboard). In the case that the electronic device is in a stand mode, the first body stands upright, the second body is supported on a support surface, and the second body is located at a rear side of the first body.

However, in the case that the electronic device is in the stand mode, the operational surface of the first body is in direct contact with the support surface, and rubs against the support surface, thus the operational surface of the first body will be severely damaged after long-term use.

In conclusion, an issue to be addressed presently by those skilled in the art is to provide an electronic device for preventing the operational surface of the first body from being damaged due to rubbing against the support surface in the case that the electronic device is in the stand mode.

SUMMARY

An electronic device is provided, which includes: a first body including a working surface; and a second body including a main body and a support body, the main body including an operational surface, wherein the main body rotatably couples to the first body and the support body via respective opposing edges of the main body.

BRIEF DESCRIPTION OF THE DRAWINGS

For more clearly illustrating embodiments of the present application, drawings referred to describe the embodiments will be briefly described hereinafter. Apparently, the drawings in the following description are only several embodiments of the present application, and for the person skilled in the art, other drawings may be obtained based on these drawings without any creative efforts.

Figure 1:
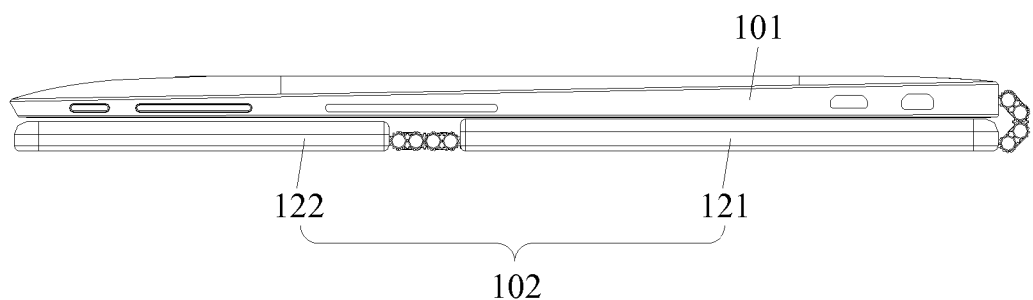
FIG. 1 is a schematic view showing the structure of an electronic device according to an embodiment of the present application in the case that the electronic device is in a laptop mode and an opening angle of a first body with respect to a second body is 0 degree.
Figure 2:
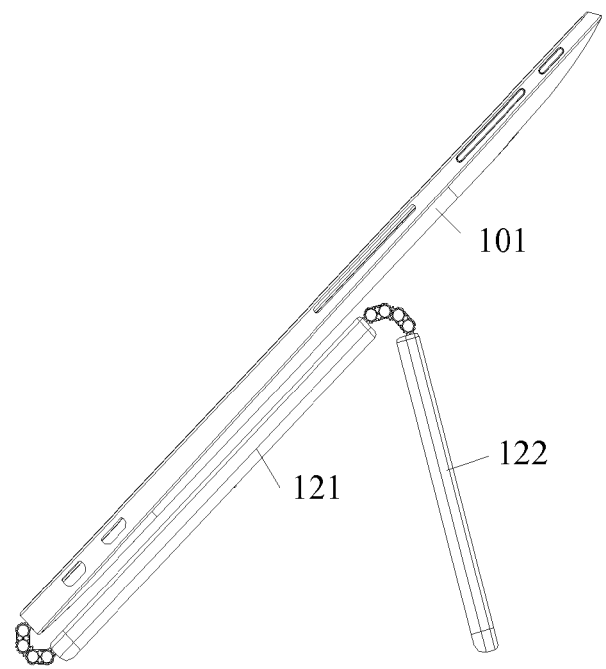
FIG. 2 is a side schematic view showing the structure of the electronic device in a stand mode according to the embodiment of the present application.
Figure 3:
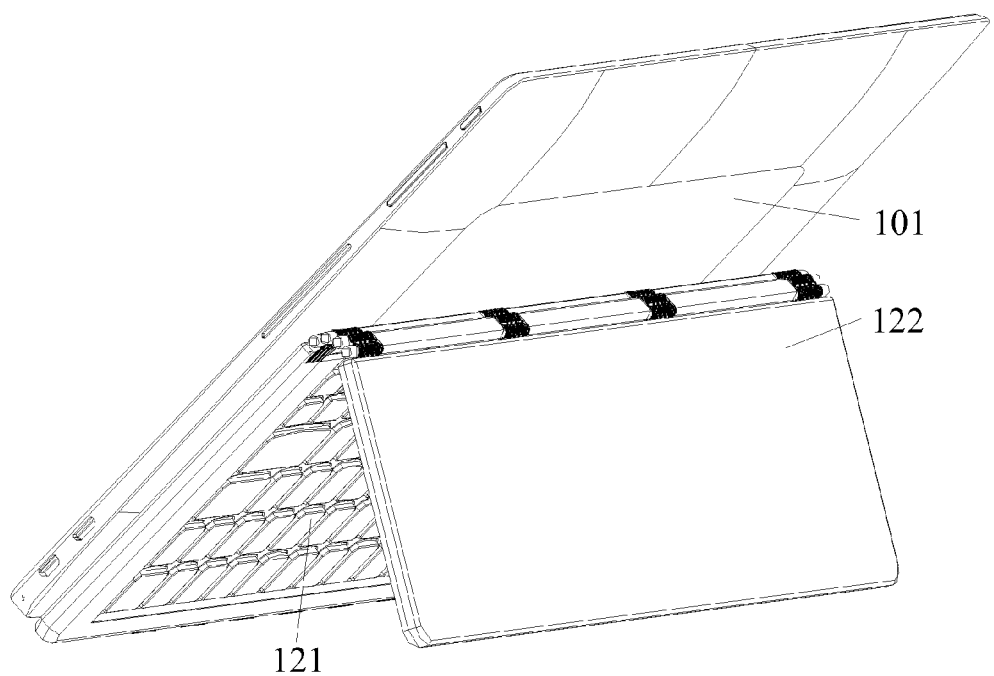
FIG. 3 is a perspective schematic view showing the structure of the electronic device in the stand mode according to the embodiment of the present application.
Figure 4:
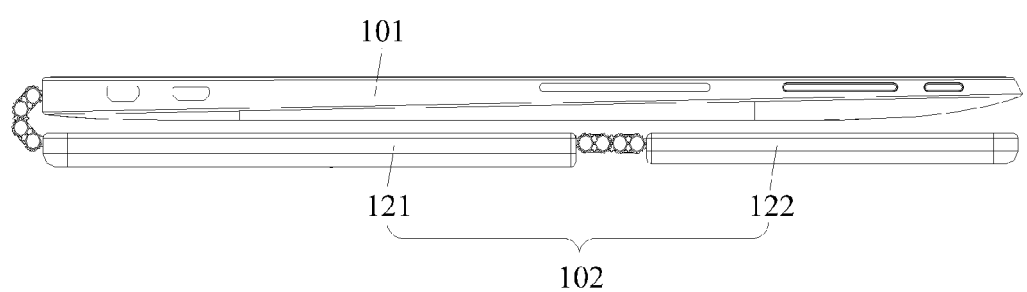
FIG. 4 is a schematic view showing the structure of the electronic device in a tablet mode according to the embodiment of the present application.
Figure 5:
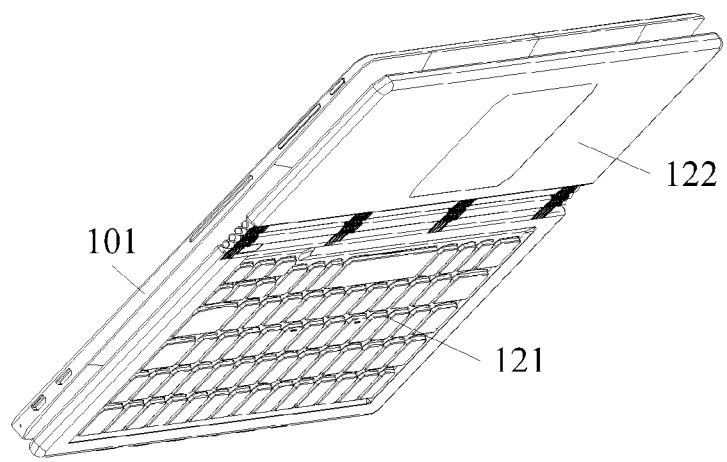
FIG. 5 is a perspective view of the electronic device in FIG. 4.
Figure 6:
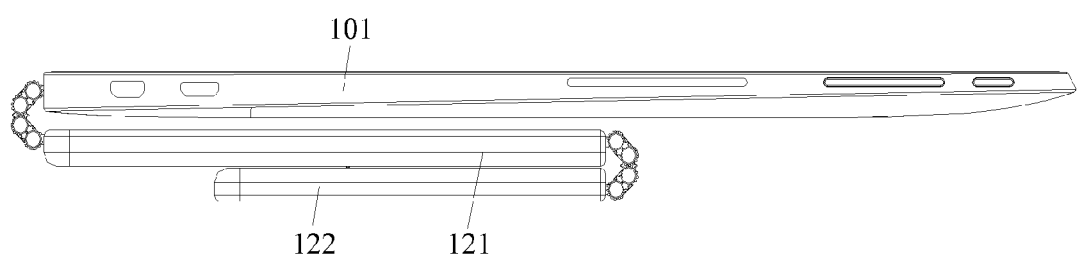
FIG. 6 is another schematic view showing the structure of the electronic device in the tablet mode according to the embodiment of the present application.

Reference numerals in FIGS. 1 to 6:

| 101 | first body, | 102 | second body; |
|---|---|---|---|
| 121 | main body; and | 122 | support plate. |

DETAILED DESCRIPTION

An electronic device is provided according to an embodiment of the present application, and in a case that the electronic device is in a stand mode, a free end of a first body is supported away from a support surface by a support body, and an operational surface of the first body is separated from the support surface of the electronic device to prevent the operational surface of the first body from being damaged due to rubbing against the support surface. Another electronic device is further provided according to an embodiment of the present application, and in a case that the electronic device is in a stand mode, a main body and a support plate of a second body are supported on a support surface in the form of a tent, which prevents an operational surface of the main body from contacting the support surface, thereby avoiding the operational surface of the main body being abraded. Another electronic device is further provided according to an embodiment of the present application, and a second body thereof has a support body rotatable around a main body of the second body, thus it is convenient for a user to change the usage attitude of the electronic device as needed.

The technical solutions in the embodiments of the present application will be described clearly and completely hereinafter in conjunction with the drawings in the embodiments of the present application. Apparently, the described embodiments are only a part of the embodiments of the present application, rather than all embodiments. Based on the embodiments in the present application, all of other embodiments, made by the person skilled in the art without any creative efforts, fall into the scope of the present application.

Reference is made to FIGS. 1 to 6. An electronic device is provided according to an embodiment of the present application, which includes a first body 101 and a second body 102. The first body 101 includes a working surface, and the second body 102 includes a main body 121 and a support body 122. The main body 121 includes an operational surface. The main body 121 rotatably couples to the first body 101 and the support body 122 via respective opposing edges of the main body 121.

The main body 121 is operable to rotate with respect to the first body 101 through an angle of 360 degrees.

The support body 122 is rotatable with respect to the main body 121 so that the support body 122 can be stacked against the main body 121. And, the support body 122 is rotatable with respect to the main body 121 through an angle no smaller than 180 degrees.

The support body 122 includes a further operational surface. The operational surface of the main body 121 is provided with a keypad assembly, and the further operational surface of the support body 122 is provided with a touchpad assembly.

The electronic device is operable in a stand mode, wherein respective corresponding edges of the main body 121 and the support body 122 are arranged to rest on a support surface to prevent the operational surface of the main body 121 from contacting against the support surface in the stand mode. In detail, in the stand mode, the main body 121 is rotated with respect to the first body 101 to abut against the side, opposite to the working surface, of the first body 101, and the support body 122 is arranged at an angle with respect to the main body 121 to support the main body 121 and the first body 101. In this case, the end of the main body 121 that is coupled to the first body 101, and a free end of the support body 122 rest on the support surface; and the end of the main body 121 that is coupled to the support body 122, and the end of the support body 122 that is coupled to the main body 121 are away from the support surface. In this way, the operational surface on the main body 121 and the further operational surface on the support body 122 are separated from the support surface, which prevents the operational surface of the main body 121 and the further operational surface on the support body 122 from being damaged due to rubbing against the support surface.

The electronic device is operable in a laptop mode, wherein the main body 121 and the support body 122 are arranged to lie flat against the support surface in the laptop mode. In detail, the side of the main body 121 that is opposite to the operational surface, and the side of the support body 122 that is opposite to the further operational surface are in contact with the support surface, and the operational surface of the main body 121 and the further operational surface of the support body 122 face upwards. Thus, the user may normally use the electronic device in a laptop mode.

The electronic device is also operable in a tablet mode, wherein the second body 102 is arranged to lie flat against the first body 101 in the tablet mode. In detail, in the tablet mode, the main body 121 and the support body 122 are rotated with respect to the first body 101 to wholly abut against the side, opposite to the working surface, of the first body 101. Thus, the user may hold the electronic device and use the electronic device in the tablet mode.

Reference is further made to FIGS. 1 to 6. An electronic device is provided according to an embodiment of the present application, which includes a first body 101 and a second body 102. The first body 101 includes a working surface and a rear surface. The second body 102 includes a main body 121 and a support body. The main body 121 includes an operational surface and a rear surface. The first body 101 is arranged at one end of the main body 121 and is rotatable around the main body 121 in a preset angle range. The electronic device has a stand mode, and in the stand mode, the second body 102 is supported on a support surface, the first body 101 stands on the support surface, and the second body 102 is located at a rear side of the first body 101. The support body is configured to support a free end of the main body 121 away from the support surface of the electronic device in the case that the electronic device is in the stand mode.

In the case that the electronic device is in the stand mode, the free end of the main body 121 is supported away from the support surface by the support body, thus the operational surface of the main body 121 is separated from the support surface of the electronic device, which prevents the operational surface of the main body 121 from being damaged due to rubbing against the support surface.

To allow a user to use the electronic device conveniently, in the electronic device, the preset angle range is from 0 degree to 360 degree, and when an opening angle of the first body 101 with respect to the second body 102 is 0 degree, the working surface of the first body 101 abuts against the operational surface of the second body 102.

In the electronic device according to the above embodiment, the support body has a tabulate structure and is articulated to the free end of the main body 121; and an end of the main body 121 opposite to the free end is articulated to the first body 101.

In the case that the electronic device is in a tablet mode, the opening angle of the first body 101 with respect to the main body 121 is 360 degree, and the user has to contact the operational surface of the main body 121 when holding the electronic device by the hand, thus for avoiding misoperation, in the electronic device according to the above embodiment, the minimum opening angle of the support body with respect to the main body 121 is set to be 0 degree. In the case that the opening angle of the support body with respect to the main body 121 is 0 degree, the support body abuts against the operational surface of the main body 121, to prevent the user from directly contacting the operational surface.

The electronic device has a laptop mode, and in the laptop mode, the second body 102 is supported on the support surface, the first body 101 stands on the support surface, and the second body 102 is located at a side of the working surface of the first body 101 (i.e. is close to the working surface of the first body 101). To allow the user to use the electronic device in the laptop mode conveniently, the maximum opening angle of the support body with respect to the main body 121 is set to be not smaller than 180 degree, which may facilitate the user unfolding the main body 121 and the support body in the case that the electronic device is in the laptop mode. Apparently, the main body 121 and the support body may also be unfolded by the user to be flat in the case that the electronic device is in the tablet mode, which reduces the entire thickness of the electronic device and facilitates the user holding the electronic device by hand.

In the electronic device according to the above embodiment, the second body 102 has a keypad assembly arranged on the main body 121, and the keypad assembly is located on the operational surface of the main body 121. The second body 102 has a touchpad assembly arranged on the support body, and the touchpad assembly is located on a first side surface of the support body. In the case that the opening angle of the support body with respect to the main body 121 is 0 degree, the first side surface of the support body abuts against the operational surface of the main body 121.

In the electronic device according to the above embodiment, the support body is a support leg which is telescopically arranged at the free end of the main body 121, and the support leg is configured to extend out from the operational surface of the second body 102. When using the electronic device, the user can make the support leg extend out of the second body 102 and fix the support leg to enable the electronic device to be in the stand mode; and in order to switch the electronic device to other modes, the user only needs to retract the support leg into the second body 102.

Another electronic device is further provided according to an embodiment of the present application, which includes a first body 101 and a second body 102. The first body 101 includes a working surface and a rear surface. The second body 102 includes a main body 121 and a support plate 122 articulated to one end of the main body 121. The main body 121 includes an operational surface and a rear surface. The first body 101 is arranged at another end of the main body 121 and is rotatable around the main body 121 in a preset angle range. The preset angle range is from 0 degree to 360 degree. In the case that an opening angle of the first body 101 with respect to the main body 121 is 0 degree, the working surface abuts against the operational surface. The electronic device has a laptop mode, a stand mode and a tablet mode. In the case that the electronic device is in the stand mode, a free end of the support plate 122, and an end, articulated to the first body 101, of the main body 121 are supported on a support surface, and ends, articulated to each other, of the main body 121 and the support plate 122 are separated from the support surface, thus the entire second body 102 is supported on the support surface of the electronic device in the form of a tent, and the second body 102 is located at a side of the rear surface of the first body 101.

In the case that the electronic device is in the stand mode, the main body 121 and the support plate 122 are bent to be supported on the support surface in the form of a tent, which prevents the operational surface of the main body 121 from contacting the support surface of the electronic device and prevents the operational surface of the main body 121 from being damaged due to rubbing against the support surface.

In the case that the electronic device is in the laptop mode, the main body 121 and the support plate 122 are arranged to lie flat, and the entire second body 102 is configured to abut against the support surface, the first body 101 is configured to stand on the support surface, and also the second body 102 is located at the side of the working surface of the first body 101. The second body 102 is located between the first body 101 and the user when the electronic device is used in the laptop mode by the user.

The first body 101 may be configured to abut against the main body 121 or to be separated from the main body 121 in the case that the electronic device is in the stand mode.

In the case that the electronic device is in the tablet mode, an opening angle of the first body 101 with respect to the main body 121 is 360 degree, and the rear surface of the first body 101 abuts against the main body 121. Also, the support plate 122 can be configured to abut against the operational surface of the main body 121 to avoid misoperation. The support plate 122 may also be configured to be unfolded to be flat with respect to the main body 121, to reduce the entire thickness of the electronic device and facilitate the user holding the electronic device by hand.

Another electronic device is further provided according to an embodiment of the present application, which can provide services to the user in multiple usage patterns. The electronic device includes a first body 101 and a second body 102. The second body 102 includes a main body 121 and a support body. The first body 101 is arranged at one end of the main body 121 and is rotatable around the main body 121. The support body is arranged at another end of the main body 121 and is rotatable around the main body 121.

With this electronic device, the user can flip the support body as needed, thereby switching the electronic device into an attitude which is most convenient for the user to use.

In the electronic device, the first body 101 includes a working surface and a first rear surface opposite to the working surface, and the main body 121 includes an operational surface and a second rear surface opposite to the operational surface.

In the case that the electronic device is in a first usage pattern, both the working surface of the first body 101 and the operational surface of the main body 121 are located at a side facing the user. In the case that the electronic device is in the first usage pattern, the working surface and the operational surface are both located at the side facing the user, which facilitates the user operating the electronic device by using the operational surface according to contents displayed on the working surface.

Further, in the case that the electronic device is in the first usage pattern, the support body and the main body 121 are arranged to lie flat, or the support body is flipped over to abut against the second rear surface of the main body 121.

In the case that the electronic device is in a second usage pattern, the working surface of the first body 101 is located at a side facing the user and the second body 102 is flipped over to a side away from the user. In the case that the electronic device is in the second usage pattern, only the first body faces the user, thus the user can read or perform operations such as touching the screen, and the user may also change the distance between him and the first body 101 as needed.

In the case that the electronic device is in the second usage pattern, the second rear surface of the main body 121 abuts against the first rear surface of the first body 101, thereby stably supporting the first body 101.

In the case that the electronic device is in the second usage pattern, the support body is turned to a position in which the support body is arranged at a preset angle with respect to the operational surface of the main body 121, so as to support the electronic device to work in the second usage pattern. In the electronic device, the support body is turned to form a preset angle with respect to the operational surface of the main body 121, thereby supporting the electronic device to be in the second usage pattern, that is, the support body supports an end, articulated to the support body, of the main body 121 away from the support surface. Further, the first rear surface of the first body 101 abuts against the second rear surface of the main body 121, thus the support body supports both the main body 121 and the first body 101 at the same time, to allow both the first body 101 and the main body 121 to stand on the support surface in an inclined state at the same time, and facilitate the user viewing the working surface of the first body 101 or operating on the working surface of the first body 101.

In the electronic device according to the above embodiment, the preset angle is greater than 0 degree and less than 360 degree.

In the case that the electronic device is in the second usage pattern, the user can unfold the main body 121 and the support body according to actual requirements.

The above embodiments in the specification are described in a progressive manner. Each of the embodiments is mainly focused on describing its differences from other embodiments, and references may be made among these embodiments with respect to the same or similar portions among these embodiments.

Based on the above description of the disclosed embodiments, the person skilled in the art is capable of carrying out or using the present application. It is obvious for the person skilled in the art to make many modifications to these embodiments. The general principle defined herein may be applied to other embodiments without departing from the spirit or scope of the present application. Therefore, the present application is not limited to the embodiments illustrated herein, but should be defined by the broadest scope consistent with the principle and novel features disclosed herein.

What is claimed is:

1. An electronic device, comprising:
a first body comprising a working surface and a rear surface opposite of the working surface; and
a second body comprising a main body and a support body, the main body comprising a keypad assembly having an operational surface and a rear surface opposite of the operational surface, the support body comprising a touchpad assembly having a further operational surface and a rear surface opposite of the further operational surface,
wherein the main body has a first end rotatably coupled to the first body and a second end opposite of the first end and rotatably coupled to the support body, and the support body has a first end rotatably coupled to the second end of the main body and a second end opposite of the first end of the support body,
wherein the electronic device is operable in a stand mode in which the first end of the main body and the second end of the support body are arranged to rest on a support surface, and the support body is configured to support the second end of the main body away from the support surface to prevent the operational surface of the main body from contacting the support surface,
wherein the support body is rotatable with respect to the main body through an angle of 360 degrees, and
wherein the electronic device is operable in a first usage mode in which the support body is stacked against the main body with the rear surface of the support body abutting against the rear surface of the main body, the support body lies on the support surface, and the second body is located on a side of the first body having the working surface.

2. The electronic device according to claim 1, wherein the main body is operable to rotate with respect to the first body through an angle of 360 degrees.

3. The electronic device according to claim 1, the electronic device being operable in a laptop mode, wherein the main body and the support body are arranged to lie flat against the support surface in the laptop mode.

4. The electronic device according to claim 1, the electronic device being operable in a tablet mode, wherein the second body is arranged to lie flat against the first body in the tablet mode.

5. The electronic device according to claim 1, wherein the support body is in the shape of a flat plate.

6. The electronic device according to claim 1, wherein when the electronic device is in the stand mode, the support body is configured to support the second end of the main body away from the support surface to prevent the operational surface of the main body and the further operational surface of the support body from contacting against the support surface in the stand mode.

7. The electronic device according to claim 1, the electronic device being operable in a tablet mode, wherein the rear surface of the first body abuts against the rear surface of the main body, and the further operational surface of the support body abuts against the operational surface of the main body.

8. The electronic device according to claim 1, the electronic device being operable in a laptop mode, wherein the main body and the support body lie flat on the support surface with the rear surfaces of the main body and the support body abutting against the support surface, and the second body is located at the side of the first body having the working surface.

9. The electronic device according to claim 1, wherein the first body is rotatable about a first axis that is parallel to the first end of the main body, and the support body is rotatable about a second axis that is parallel to the second end of the main body.

10. The electronic device according to claim 1 wherein:
the electronic device is operable in a second usage mode in which the further operational surface of the support body abuts against the operational surface of the main body; and
the support body is rotated through an angle of 360 degrees with respect to the main body when the electronic device is in the first usage mode relative to when the electronic device is in the second usage mode.

11. An electronic device, comprising:
a touchscreen;
a keyboard;
a first hinge joining a first longitudinal edge of the keyboard to a longitudinal edge of the touchscreen and allowing the keyboard to rotate through an angle of 360 degrees with respect to the touchscreen;
a touchpad; and
a second hinge joining a longitudinal edge of the touchpad to a second longitudinal edge of the keyboard opposite the first longitudinal edge and allowing the touchpad to rotate through an angle of 360 degrees with respect to the keyboard.

12. The electronic device according to claim 11 wherein:
each of the touchscreen, the keyboard, and the touchpad have a user interface side and a backside opposite of the user interface side;
the first hinge allows the keyboard to rotate between a first position in which the user interface side of the keyboard abuts against the user interface side of the touchscreen and a second position in which the backside of the keyboard abuts against the backside of the touchscreen; and
the second hinge allows the touchpad to rotate between a first position in which the user interface side of the touchpad abuts against the user interface side of the keyboard and a second position in which the backside of the touchpad abuts against the backside of the keyboard.

* * * * *